June 16, 1953
F. P. SOLLINGER
2,642,275
FLUID PRESSURE SPEED SENSING DEVICE
Filed Jan. 29, 1949
2 Sheets-Sheet 1
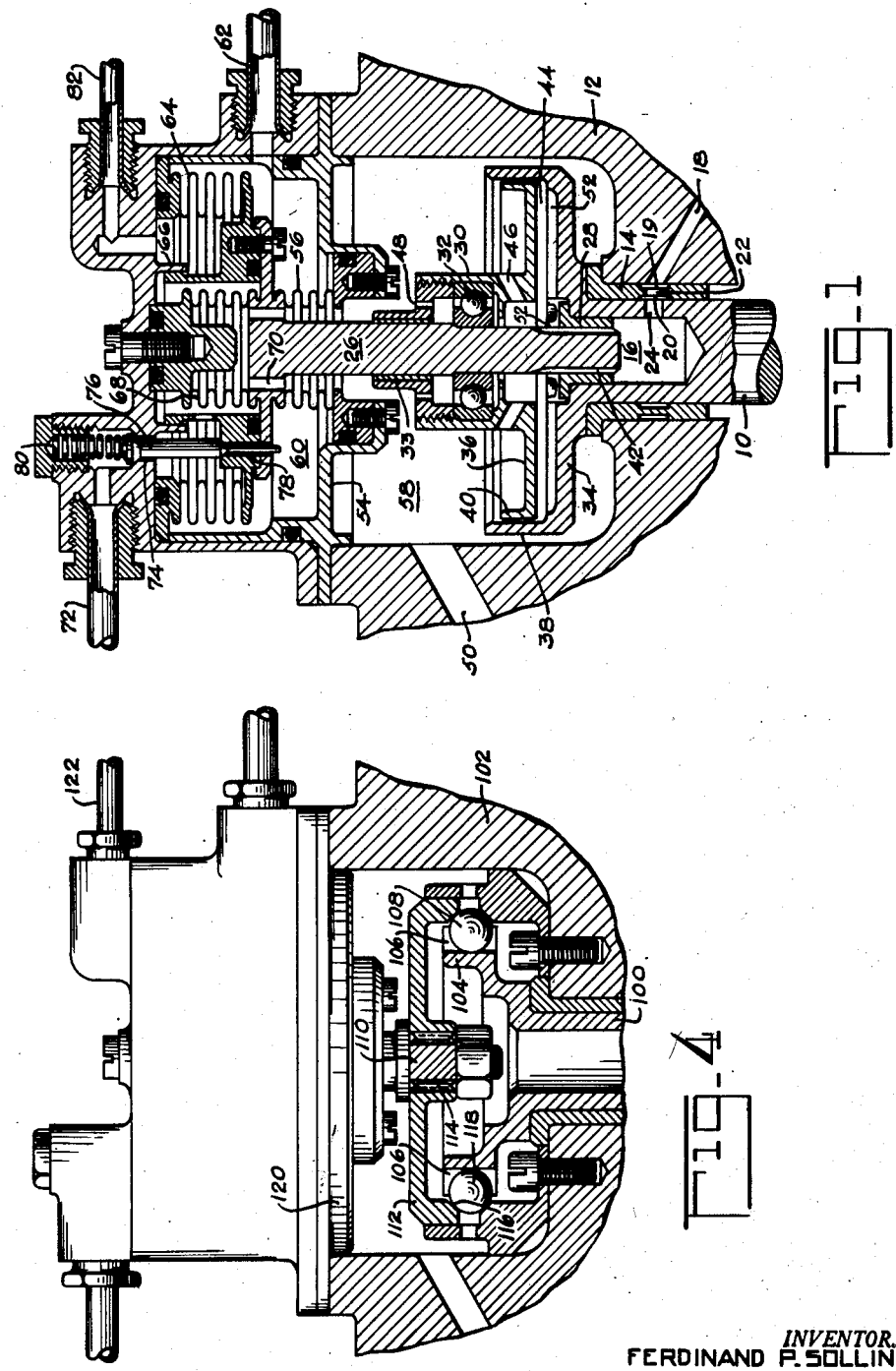
INVENTOR.
FERDINAND P. SOLLINGER.
BY *Victor D. Behr*
ATTORNEY

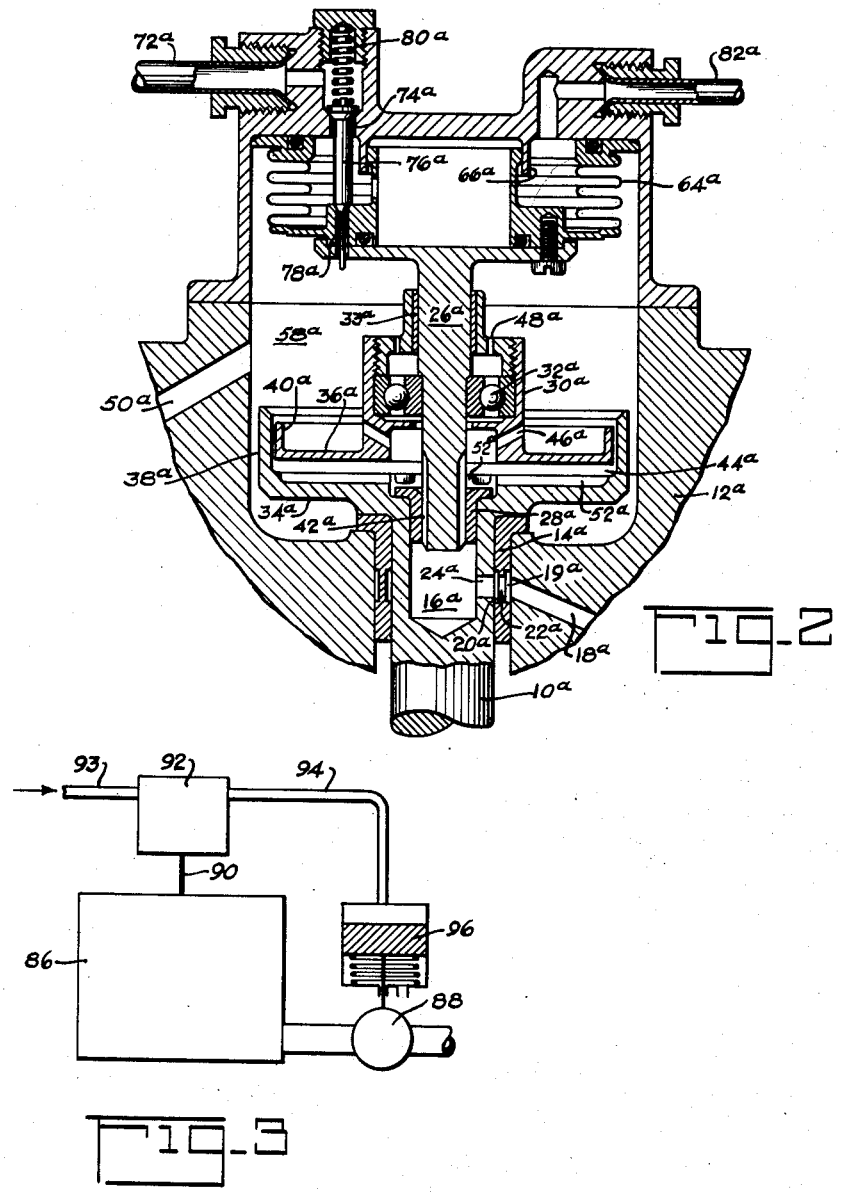

Patented June 16, 1953

2,642,275

UNITED STATES PATENT OFFICE 2,642,275

FLUID PRESSURE SPEED SENSING DEVICE

Ferdinand P. Sollinger, Paterson, N. J., assignor to Curtiss-Wright Corporation, a coporation of Delaware Application January 29, 1949, Serial No. 73,603

4 Claims. (Cl. 264—14)

This invention relates to speed sensing mechanisms and is particularly directed to such mechanisms providing a fluid pressure which is a function of the speed of a rotating member.

A primary object of this invention is the provision of a novel speed sensing mechanism for obtaining fluid pressure which is a function of the speed of rotation of a rotating member. A further object of the invention relates to the provision of such a mechanism in which no fluid pressure seals are necessary between the fixed and rotating parts of the mechanism. Such a mechanism obviously may be used for measuring and/or for controlling the speed of rotation of an engine shaft or other rotating part.

Other objects of the invention will become apparent upon reading the annexed detailed description in connection with the drawing in which:

Figure 1 is a sectional view through a speed sensing mechanism embodying the invention;

Figure 2 is a view partly in section illustrating a modification of Figure 1;

Figure 3 is a schematic view illustrating use of the speed sensing mechanism for controlling the speed of rotation of an engine; and Figure 4 is a partial view illustrating a modification of Figures 1 and 2.

Referring to Figure 1, a shaft 10, whose speed of rotation is to be sensed, has one end journaled in a housing 12 by a bushing 14. A suitable liquid, such as lubricating oil, is continually supplied to a bore 16 within the shaft 10 from a passage 18 in the housing 12. The passage 18 communicates with the bore 16 through annular grooves 19 and 20 and interconnecting holes 22 in the bushing 14 and thence through one or more holes 24 in the shaft 10 alined with the annular groove 20. A non-rotatable axially movable rod 26 has one end piloted within the bore 16 of the shaft 10 by a bushing 28. A thrust member 30 is journaled on the axially movable rod 26 by thrust bearing 32 secured to said rod and by a plain bearing 33. The thrust member 30 and shaft 10 have axially spaced radially extending flanges 34 and 36 with cylindrical rims 38 and 40 respectively. Axial grooves 42 between the rod 26 and the bushing 28 admit lubricating oil from the shaft bore 16 into the annular space 44 between the flanges 34 and 36, said fluid escaping or discharging from said space into the housing through a restricted passage between the cylindrical rims 38 and 40 of said flanges. The size of the passage 18 and the pressure of the oil supplied thereto are such that said passage supplies oil to the space 44 at a rate sufficiently in excess of the rate at which said oil escapes from said space through the restricted passage between the rims 38 and 40 that said space remains full of oil during operation of the device. The excess lubricating oil supplied to the bore 16 enters into the housing 12 through the grooves 42 and thence through holes 46 in the thrust member 30. From the housing 12 the oil escapes through a drain passage 50 which, when the shaft 10 is driven by an engine, may communicate with the crankcase of said engine. The flange 34 on the shaft 10 is provided with radially extending vanes or ribs 52 for rotating the lubricating oil within the annular space 44 with the shaft 10.

A fixed partition 54 extends across the housing 12, said partition being secured to the rod 26 by a flexible diaphragm or bellows 56 thereby dividing said housing into chambers 58 and 60, the chamber 58 communicating with the drain passage 50. The chamber 60 may be vented to the surrounding atmosphere or connected to some desired source of pressure through a passage 62. The rod 26 extends into the chamber 60 and is secured to a bellows 64 attached to the adjacent end of the housing 12. This end of the housing is also provided with a cylindrical flange 66 within which the bellows 64 and the adjacent end of the rod 26 are piloted. In addition the end of the rod 26 within the chamber 60 is enclosed by a bellows or flexible diaphragm 68 secured to the adjacent end of the housing 12 and passages 70 connect the interior of said bellows with the chamber 58.

A fluid under pressure, for example air, is admitted into the chamber provided by the bellows 64 from a supply conduit 72 and through a passage 74. One end of a poppet-type valve 76 controls the admission of fluid into the bellows 64 through a passage 74. In addition the bellows 64 is provided with a vent passage 78 controlled by the other end of the valve 76. A spring 80 urges the valve 76 in a direction for closing both passages 74 and 78. An outlet passage 82 also communicates with the interior of the bellows 64 for transmitting the fluid pressure within said bellows to measuring and/or control apparatus.

With the above described construction, when the shaft 10 rotates and oil is supplied through the passage 18, said oil flows radially outwardly into the annular space 44 and the vanes 52 cause this oil in the space 44 to rotate with the shaft 10. Therefore the centrifugal force acting on the oil in the space 44 increases with increase in the speed of rotation of the shaft 10 thereby creating an oil pressure in the space 44 which imposes a force on the thrust member 30 urging said member axially upwardly as viewed in the drawing. This oil pressure force is transmitted to the rod 26 through the thrust bearing 32 and is opposed by the fluid pressure within the bellows 64 to which the rod 26 is connected, the adjacent end of the rod 26 in effect forming a movable wall for the chamber within the bellows 64.

Neglecting for the moment the pressure within the space 60 and the spring stiffness of the various bellows, if said oil pressure force exceeds that imposed by the fluid pressure within the bellows 64 then the member 30 and rod 26 will move upwardly. This upward movement of the rod 26 will cause the valve 76 to seat against its vent passage 78 and will move said valve upward to effect an opening adjustment of the fluid pressure passage 74 until the pressure within the bellows 64 increases sufficiently to balance said oil pressure force. If said oil pressure force is or becomes less than that imposed on the rod 26 by the fluid pressure within the bellows 64, then said bellows expands so as to effect a closing adjustment of the passage 74 and a valve opening adjustment of the passage 78 thereby venting some of the pressure within said bellows 64 until a balance is again established. In this way the pressure within the bellows 64 is automatically controlled so as to balance the opposing force exerted on the rod 26 through the member 30 by the oil pressure within the annular space 44. Since this oil pressure is created by the centrifugal force on the oil in the space 44, as a result of the rotation imparted to said oil by the shaft 10, the opposing fluid pressure within the bellows 64 is a function of the speed of rotation of this shaft 10. The fluid pressure within the chamber 60 merely adds to the pressure necessary within the bellows 64 to balance the force exerted on the thrust member 30 by the oil within the annular space 44 while the stiffness of the various bellows merely add or subtract from this force depending on whether the bellows are in tension or compression.

With the bellows 56 and 68 and the partition 54, the vent pressure in the chamber 58 exerts substantially no force on the axially movable rod 26. Therefore if the chamber 58 were vented to the crankcase of an engine, variations in the pressure within said crankcase would have substantially no effect on the control fluid pressure within the bellows 64. In addition by maintaining some fixed absolute pressure within the chamber 60, the absolute value of the fluid pressure within the bellows 64 varies as a function of the speed of rotation of the shaft 10. This is of value, for example in a power control system for an aircraft engine where it is desired to eliminate or modify the effects, on the control system, of variations of atmospheric pressure with altitude. Where, however, the speed sensing mechanism is only used to measure and/or control the speed of a rotating part and the chamber 58 is vented to substantially atmospheric pressure, then the bellows 56 and 68 and the partition 54 can be eliminated. Such a simplified modification is illustrated in Figure 2.

In Figure 2 the parts corresponding to those of Figure 1 have been designated by like reference numerals but with the letter *a* added thereto. The operation of Figure 2 is essentially the same as that of Figure 1 except instead of some absolute pressure the substantially atmospheric pressure of the chamber 58a acts against the exterior of the bellows 64a. Accordingly the mechanism of Figure 2 automatically operates to maintain an above atmospheric pressure within the bellows 64a which is a function of the speed of rotation of the shaft 10a.

Figure 3 is a view schematically illustrating use of the speed sensing mechanism for automatically controlling the speed of rotation of a rotatable machine or engine. In Figure 2 the block 86 designates an engine whose speed of rotation can be adjusted by varying the position of a member 88 which may comprise a valve or some other instrumentality. As a specific example, the engine 86 and valve 88 may comprise the turbine and balanced speed control valve respectively, disclosed in copending application Serial No. 57,144, filed October 29, 1948. A shaft 90 whose speed is to be sensed is driven by the engine 86, said shaft extending into and forming part of the speed sensing mechanism 92 which for example may be similar to that illustrated in Figure 2. A fluid under pressure is supplied to the mechanism through the conduit 93 and the pressure automatically controlled by said mechanism is transmitted through the outlet passage 94. Thus the passages 93 and 95 of Figure 3 correspond to the passages 72a and 82a of Figure 2. The fluid pressure automatically controlled by the speed sensing mechanism 92 is transmitted through its outlet passage 94 and acts against one side of a piston 92, thereby urging said piston against a spring for automatically positioning the member or valve 88, the other side of said piston being vented to the atmosphere. Upon an increase in the speed of rotation of the engine and its shaft 90, the speed sensing mechanism 92 automatically increases its controlled fluid pressure acting against the piston 96. The piston 96 thereupon moves to adjust the member or valve 88 so as to decrease the speed of the engine 86. In this way the speed sensing mechanism can be used to control the speed of rotation of a rotating part.

The modification of Figure 4 is generally similar to that of Figure 1 except the oil used in Figure 1 is replaced by fly-weights rotatable by a shaft 100 whose speed of rotation is to be sensed. The shaft 100 extends into a housing 102 and has a flange 104 at its inner end. A plurality of circumferentially spaced notches 106 are formed about the periphery of said flange and a spherical ball or flyweight 108 is disposed within each of said notches. A non-rotatable and axially movable rod 110 corresponding to the rod 26 of Figure 1, has a thrust member 112 splined thereto at 114. The thrust member 112 has a conical surface 116 facing and engageable by the balls 108. The balls 108 also engage a conical surface secured to the housing 102. The arrangement is such that when the shaft 110 rotates, the flyweights or balls 108 are urged radially outwardly by the centrifugal forces acting thereon. The axial component of the centrifugal forces acting against the conical surface 116 urges the rod 110 axially upwardly as viewed in Figure 4.

A partition 120, similar to the partition 54 of Figure 1 is disposed across the housing 102 and the rod 110 extends upwardly beyond said partition. That portion of Figure 4 above the partition 120 is identical to the corresponding portion of Figure 1. Accordingly the operation of Figure 4 is substantially the same as that of Figure 1. In Figure 4 the controlled fluid pressure transmitted to the outlet conduit 122 (corresponding to the conduit 82 of Figure 1) is balanced by the axial component of the force exerted by the balls 108 against the conical surface 116 as a result of the centrifugal forces acting on said balls instead of, as in Figure 1, by the centrifugal force acting on a rotating mass of oil. Therefore the mechanism of Figure 4 also provides a fluid pressure which is a function of the speed of rotation of a shaft. Just as Figure 1 may be modified, as illustrated in Figure 2, by omitting the partition 54 and the bellows 56 and 68, Figure 4 may be similarly modified.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. Speed sensing mechanism comprising first and second members, said first member being rotatable and said second member spaced axially from and being movable axially relative to said first member with the axially-spaced facing surfaces of said members forming opposed walls of the space between said members; means for continually supplying a liquid to said space to maintain said space full of liquid during operation of said mechanism; means for causing rotation of the liquid within said space with said rotatable member whereby the centrifugal force acting on said liquid produces a liquid pressure in said space subjecting said second member to an axial force; means for subjecting said second member to the force of a fluid pressure opposing said axial force; and means controlled by axial movements of said second member for varying the magnitude of said fluid pressure to balance the axial forces acting on said second member whereby said fluid pressure is a function of the speed of rotation of said first member.

2. Speed sensing mechanism comprising first and second co-axial rotatable members, said second member being axially spaced from and being axially movable relative to said first member with the axially-spaced facing surfaces of said members forming opposed walls of the space between said members; means for continually supplying a liquid to said space to maintain said space full of liquid during operation of said mechanism; means for causing rotation of the liquid within said space with said rotatable members whereby the centrifugal force acting on said liquid produces a liquid pressure in said space subjecting said second member to a first axial force; a non-rotatable third member; means operatively connecting said third member to said second member for axial movement therewith; means for subjecting said third member to a fluid under pressure providing a second axial force opposing said first axial force; and means controlled by said third member in response to axial movements of said third member for varying the magnitude of said fluid pressure to balance the axial forces acting on said second member whereby said fluid pressure is a function of the speed of rotation of said first and second members.

3. Speed sensing mechanism comprising first and second co-axial rotatable members, each of said rotatable members having a radially outwardly extending annular flange axially spaced from the corresponding flange of the other of said members to provide a space therebetween co-axial with said members with the axially-facing surfaces of said flanges forming the axially opposed walls of said space and with said second rotatable member being axially movable relative to said first rotatable member; means for continually supplying a liquid to said space to maintain said space full of liquid during operation of said mechanism, said flanges being formed to provide a restricted outlet passage for said liquid from said space adjacent to its periphery; a plurality of circumferentially-spaced vanes on at least one of said members for causing rotation of the liquid in said space with said rotatable members whereby the centrifugal force acting on said liquid produces a liquid pressure in said space subjecting said second member to a first axial force; means operatively connected to said second member for axial movement therewith; means for subjecting said axially movable means to a fluid under pressure providing a second axial force opposing said first axial force; and a valve controlled by said axially movable means in response to axial movements thereof for varying the magnitude of said fluid pressure to balance the axial forces acting on said second member whereby said fluid pressure is a function of the speed of rotation of said first and second members.

4. Speed sensing mechanism comprising a housing; a rotatable first member extending into said housing; a rotatable second member co-axial with said first member and disposed within said housing, said second member being axially movable relative to said first member and said members having a space therebetween co-axial with said members with the axially-spaced facing surfaces of said members forming opposed walls of said space; means for continually supplying a liquid to said space to maintain said space full of liquid during operation of said mechanism; means for causing rotation of the liquid within said space with rotatable members whereby the centrifugal force acting on said liquid produces a liquid pressure in said space subjecting said second member to an axial force; movable means disposed within said housing and operatively connected to said second member for axial movement therewith; means for supplying a fluid under pressure into said housing for subjecting said movable means to a fluid pressure force opposing said axial force; and valve means disposed within said housing and automatically controlled by said movable means in response to axial movements thereof for varying the magnitude of said fluid pressure to balance the axial forces acting on said second member whereby said fluid pressure is a function of the speed of rotation of said first and second members.

FERDINAND P. SOLLINGER.

References Cited in the file of this patent

UNITED STATES PATENTS

| Number | Name | Date |
|---|---|---|
| 1,530,740 | Smoot | Mar. 24, 1925 |
| 2,013,222 | Thomas | Sept. 3, 1935 |
| 2,250,983 | Adler | July 29, 1941 |

FOREIGN PATENTS

| Number | Country | Date |
|---|---|---|
| 763 | Great Britain | Feb. 24, 1877 |
| 579,868 | France | Aug. 14, 1924 |